(12) United States Patent
Seo

(10) Patent No.: US 10,477,306 B2
(45) Date of Patent: Nov. 12, 2019

(54) SOUND DEVICE

(71) Applicant: AMOGREENTECH CO., LTD., Gimpo-si (KR)

(72) Inventor: In Yong Seo, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 0 days.

(21) Appl. No.: 15/753,750

(22) PCT Filed: Aug. 19, 2016

(86) PCT No.: PCT/KR2016/009154
§ 371 (c)(1),
(2) Date: Feb. 20, 2018

(87) PCT Pub. No.: WO2017/034224
PCT Pub. Date: Mar. 2, 2017

(65) Prior Publication Data
US 2018/0242079 A1    Aug. 23, 2018

(30) Foreign Application Priority Data
Aug. 21, 2015    (KR) .......................... 10-2015-0117902

(51) Int. Cl.
*H04R 1/44* (2006.01)
*H04M 1/03* (2006.01)
(Continued)

(52) U.S. Cl.
CPC ................ *H04R 1/44* (2013.01); *H04M 1/03* (2013.01); *H04R 1/02* (2013.01); *H04R 1/023* (2013.01);
(Continued)

(58) Field of Classification Search
CPC .... H04R 1/023; H04R 1/44; H04R 2201/029; H04M 1/03; C09J 7/00; C09J 7/20;
(Continued)

(56) References Cited

U.S. PATENT DOCUMENTS 6,790,926 B1 * 9/2004 Spijkers ............. C08G 18/6674
135/87
8,075,989 B2 * 12/2011 Borgwardt ........ B29C 66/30326
156/60
(Continued)

FOREIGN PATENT DOCUMENTS

JP       3669782       7/2005
JP     2014207590     10/2014
(Continued)

OTHER PUBLICATIONS

International Search Report—PCT/KR2016/009154 dated Nov. 18, 2016.

*Primary Examiner* — Jesse A Elbin
(74) *Attorney, Agent, or Firm* — Cantor Colburn LLP

(57) ABSTRACT

Provided is a sound device having a membrane attached between a case and an electro-acoustic transducer using an adhesive foam tape, thereby enabling the prevention of a deterioration of vibration amplitude-related properties of the membrane, and the prevention of a distortion of sound that is being delivered. The sound device includes: a waterproof air-permeable membrane permeating gas entering and exiting an electro-acoustic transducer disposed inside the sound-transmitting hole and blocking the inflow of water; and a first adhesive foam tape having one side adhered to the membrane and the other side adhered to the case to adhere an edge of the membrane to a periphery of the sound-transmitting hole of the case. The first adhesive foam tape is provided with a plurality of pores formed on adhesive (Continued)

surfaces of the one side and the other side respectively bonded to the membrane and the case and filled with an adhesive material.

14 Claims, 4 Drawing Sheets

(51) Int. Cl.
*H04R 1/02* (2006.01)
*H04R 1/08* (2006.01)
*H04M 1/18* (2006.01)

(52) U.S. Cl.
CPC ............... *H04R 1/086* (2013.01); *H04M 1/18* (2013.01); *H04R 1/083* (2013.01); *H04R 2201/029* (2013.01); *H04R 2499/11* (2013.01); *H04R 2499/15* (2013.01)

(58) Field of Classification Search
CPC ...... C09J 7/243; C09J 7/38; C09J 5/08; B32B 5/18; B32B 5/22; B32B 5/24; B32B 5/245; B32B 2333/00; B32B 2333/04; B32B 2333/08; B32B 2333/12; B32B 2375/00
USPC ........... 381/165, 189, 344; 428/304.4, 306.6, 428/308.4, 309.9, 317.1, 317.3, 317.7
See application file for complete search history.

(56) References Cited

U.S. PATENT DOCUMENTS

| | | | | |
|---|---|---|---|---|
| 10,092,883 | B2* | 10/2018 | Furuuchi | H05K 5/06 |
| 2009/0092819 | A1* | 4/2009 | Malik | A61K 9/7092 |
| | | | | 428/305.5 |
| 2010/0297414 | A1* | 11/2010 | Brentrup | B32B 5/22 |
| | | | | 428/215 |
| 2012/0040581 | A1* | 2/2012 | Kim | C04B 35/62218 |
| | | | | 442/330 |
| 2015/0070842 | A1* | 3/2015 | Lee | D01D 5/0038 |
| | | | | 361/692 |
| 2017/0157573 | A1* | 6/2017 | Mori | B01D 71/36 |
| 2018/0035203 | A1* | 2/2018 | Hirai | H04M 1/02 |

FOREIGN PATENT DOCUMENTS

| | | |
|---|---|---|
| JP | 2015111816 | 6/2015 |
| KR | 1020110030582 | 3/2011 |
| KR | 1020130129104 | 11/2013 |
| KR | 1020130129105 | 11/2013 |

* cited by examiner

SOUND DEVICE

TECHNICAL FIELD

The present invention relates to a sound device, and more particularly, to a sound device having a membrane attached between a case and an electro-acoustic transducer by using an adhesive foam tape, thereby enabling the prevention of a deterioration of vibration amplitude-related properties of the membrane, and the prevention of a distortion of sound that is being delivered.

BACKGROUND ART

Generally, waterproof air-permeability is achieved by passing gases, such as water vapor, and not passing liquids. In order to produce such a waterproof air-permeable living article, a flat waterproof air-permeable membrane is used. The waterproof air-permeable membrane is a membrane that passes gases such as air and water vapor but does not pass liquids such as water, and used as various kinds of uses such as a disposable diapers and disposable sanitary pad covers, disposable clothing or waterproof clothing such as sportswear or anti-epidemic clothing, architectural house wraps, packaging materials, or sanitary materials.

Recently, various attempts have been made to develop a component having more excellent waterproof air-permeability in order to maintain the reliability of components optimally in various fields such as electronic devices, automobiles, and aviation.

For example, since portable electronic devices are carried and used, a waterproof function is required. At the same time, portable electronic devices are provided with sound-transmitting holes for emitting sound from a speaker or a microphone to the outside or for passing sound from the outside to the inside. Water or dust may penetrate into the electronic device through the sound-transmitting hole, and thus a waterproof filter or a waterproof sound sheet for passing sound and blocking water and dust should be installed in the sound-transmitting hole.

Korean Patent Application Publication No. 10-2011-0030582 (Patent Document 1) discloses an acoustic component in which a waterproof filter is made of porous polytetrafluoroethylene as a fluorine resin, and is attached to an outer case of an electronic device to cover the sound-transmitting hole by using a double-sided adhesive tape.

In the above-described Patent Document 1, a double-sided adhesive tape is used to attach the waterproof filter to the case. Since the double-sided adhesive tape has a structure in which an adhesive layer is formed on either surface of a base layer, burs of an adhesive material occur from the adhesive layer at the time of blanking the double-sided adhesive tape in an annular form. In addition, if pressure is applied during a bonding process, the adhesive material of the adhesive layer cannot be absorbed into the base layer, but is released to the outside and leaked to the waterproof filter or the waterproof sound sheet. If the adhesive material of the double-sided tape leaks to the waterproof filter or the waterproof sound sheet, the sound transmission efficiency or sound transmission characteristics of the waterproof filter or the waterproof sound sheet are adversely affected.

DISCLOSURE

Technical Problem

The present invention has been made in view of the above-mentioned problems, and it is an object of the present invention to provide a sound device capable of preventing the leakage of an adhesive material during performing adhering and blanking for an assembly of a membrane by using an adhesive foam tape as an adhesive unit.

It is another object of the present invention to provide a sound device having a membrane adhered and fixed to the periphery of a sound-transmitting hole of a case with an adhesive foam tape in which a plurality of pores filled with an adhesive material are formed on an adhesive surface, thereby enabling the prevention of a deterioration of vibration amplitude-related properties of a membrane, and the prevention of a distortion of sound that is being delivered.

Technical Solution

In order to achieve the above object, according to an aspect of the present invention, there is provided a sound device arranged so as to cover a sound-transmitting hole in an inside of a case having the sound-transmitting hole of an electronic device, the sound device comprising: a waterproof air-permeable membrane that permeates gas entering and exiting an electro-acoustic transducer disposed inside the sound-transmitting hole and blocks the inflow of water; and a first adhesive foam tape having one side adhered to the membrane and the other side adhered to the case so as to adhere an edge of the membrane to a periphery of the sound-transmitting hole of the case, wherein the first adhesive foam tape is provided with a plurality of pores formed on adhesive surfaces of the one side and the other side respectively bonded to the membrane and the case and filled with an adhesive material.

In the sound device according to an embodiment of the present invention, the sound device may further include an adhesive unit for attaching the membrane to the electro-acoustic transducer, wherein the adhesive unit is a second adhesive foam tape or a double-sided tape. According to an embodiment of the present invention, the second adhesive foam tape may have a plurality of pores formed on the adhesive surface and filled with an adhesive material.

According to an embodiment of the present invention, both the first and second adhesive foam tapes may have a porous elastic structure capable of being restored after being compressed when a body has a plurality of pores and is externally pressurized, and the adhesive material filled in the pores may receive the adhesive material while partially deforming the shape of the pores according to external pressurization. According to an embodiment of the present invention, the plurality of pores are not interconnected.

According to an embodiment of the present invention, the first and second adhesive foam tapes may have a compressibility of 20% to 70%, preferably, 20% to 40%. According to an embodiment of the present invention, the first and second adhesive foam tapes may be any one of an acrylic foam, a urethane foam, and a polyethylene (PE) foam.

According to an embodiment of the present invention, the thickness of the first and second adhesive foam tapes may be in a range of 50 μm to 250 μm.

In the sound device according to an embodiment of the present invention, the membrane may be a fibrous web formed by accumulating fibers obtained by electrospinning a spinning solution in which a polymer material and a solvent are mixed.

In the sound device according to an embodiment of the present invention, the membrane may have a plurality of pores or may be a non-porous film.

According to an embodiment of the present invention, the porosity of the membrane may be in a range of 20% to 90%, preferably 20% to 50%.

In the sound device according to an embodiment of the present invention, the diameter of the fibers may be in a range of 0.1 μm to 2 μm, and the thickness of the membrane may be in a range of 4 μm to 12 μm.

In the sound device according to an embodiment of the present invention, the electro-acoustic transducer may be a speaker or a microphone.

According to an embodiment of the present invention, the membrane and the electro-acoustic transducer may not be bonded to each other, and a cushion member may be attached to a front surface of the electro-acoustic transducer.

Advantageous Effects

According to the present invention, a membrane is adhered and assembled in a periphery of a sound-transmitting hole of a case with an adhesive foam tape having a plurality of pores filled with an adhesive material and formed on an adhesive surface, and thus the adhesive material is restrained on the adhesive surface of the adhesive foam tape so as not to leak to the outside, to thereby improve the assembly reliability.

According to the present invention, an adhesive foam tape used as an adhesive unit of a sound device has an advantage that the adhesive material does not leak to an area removed after performing a blanking process for forming an air-permeable passage.

Therefore, the sound device according to the present invention prevents the adhesive material from leaking to the outside during bonding and blanking, and thus when the membrane is bonded between the case and the electro-acoustic transducer, the weight change and shape deformation of the membrane do not occur, thereby enabling the prevention of a deterioration of vibration amplitude-related properties of the membrane, and the prevention of a distortion of sound that is being delivered.

BEST MODE

Hereinafter, embodiments of the present invention will be described in detail with reference to the accompanying drawings.

Figure 1:
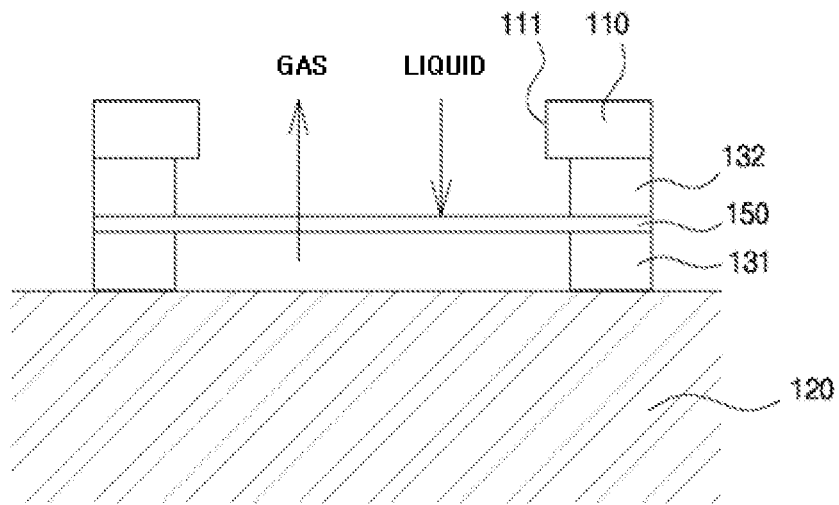
FIG. 1 is a conceptual cross-sectional view for explaining a sound device according to an embodiment of the present invention.
Figure 2:
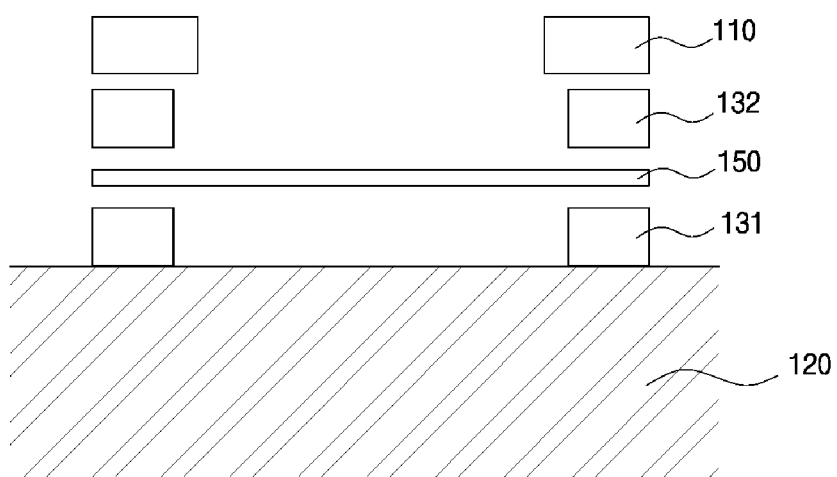
FIG. 2 is a conceptual exploded cross-sectional view for explaining a method of assembling a sound device according to an embodiment of the present invention.

Referring to FIGS. 1 and 2, a sound device according to an embodiment of the present invention is provided so as to cover a sound-transmitting hole 111 for passing sound from the inside of an outer case 110 to the outside thereof and from the outside of the outer case 110 to the inside thereof in an electronic device in which an electro-acoustic transducer 120 is mounted.

The sound device according to the embodiment of the present invention includes: a waterproof air-permeable membrane 150 which permeates gas and blocks an inflow of liquid such as water; and a first adhesive foam tape 132 having a plurality of pores formed on both sides thereof and filled with an adhesive material adhered to one side of an outer case 110 and the membrane 150, so as to cover and attach the membrane 150 to the case 110 having the sound-transmitting hole 111.

In addition, the sound device according to the embodiment of the present invention is configured such that the waterproof air-permeable membrane 150 covers and is closely fixed to the sound-transmitting hole 111 of the case 110 using the first adhesive foam tape 132 as described above, and thus the outer case 110 has a waterproof function.

Therefore, the sound device according to the embodiment of the present invention may be fixed or not attached to an electro-acoustic transducer 120 disposed inside. For example, when the sound device according to the embodiment of the present invention is attached and fixed to the electro-acoustic transducer 120, a second adhesive foam tape 131 having the same structure as the first adhesive foam tape 132 may be used, or a double-sided adhesive tape may be used. In addition, when the sound device according to the embodiment of the present invention is not attached and fixed to the electro-acoustic transducer 120, a cushion member or the like may be attached to the whole surface of the electro-acoustic transducer 120.

The adhesive material on one side of the first adhesive foam tape 132 is adhered to the membrane 150 and the adhesive material on the other side of the first adhesive foam tape 132 is adhered to the case 110.

The second adhesive foam tape 131 is an adhesive foam tape adhered to the other side of the membrane 150 and having a plurality of pores on both sides thereof and filled with an adhesive material to be adhered to the electro-acoustic transducer 120.

Here, the sound-transmitting hole 111 formed in the outer case 110 of the electronic device may be formed of a plurality of small holes so as to prevent foreign substances from entering from the outside of the case, and at least one sound-transmitting hole 111 or more may be formed.

The electro-acoustic transducer 120 refers to a speaker, a microphone, a receiver, and the like having a vibrating body therein. The electronic device may be a cellular phone, a small radio, a transceiver, a portable music player, a notebook, a headphone, an earphone, an outdoor microphone, a digital camera, or the like in which the electro-acoustic transducer 120 is mounted.

Meanwhile, the first and second adhesive foam tapes 132 and 131 have a double-sided adhesive surface and a plurality of pores filled with an adhesive material on both surfaces thereof. The first and second adhesive foam tapes 132 and 131 may be formed of an elastic material. More specifically, a foam tape made of an acrylic foam, a urethane foam, a polyethylene (PE) foam, or the like may be used as the first and second adhesive foam tapes 132 and 131.

The first and second adhesive foam tapes 132 and 131 may have a compressibility of 20% to 70%, preferably 20% to 40%, and preferably have a thickness of, for example, 50 µm to 250 µm. A plurality of pores 130a formed on the first and second adhesive foamed tapes 132 and 131 are not interconnected.

The first and second adhesive foam tapes 132 and 131 are attached along the outer circumference of a speaker, a microphone or the like constituting the electro-acoustic transducer 120, for example, the outer circumference of a shape of a circle, an ellipse or a quadrangle, and thus may be made of circular, elliptical, or rectangular bands.

The membrane 150 is a fiber web formed by accumulating fibers obtained by electrospinning a spinning solution containing a mixture of a polymer material and a solvent, wherein the diameter of the fibers is in a range of 0.1 µm to 2 µm. In many pore-type membranes, the size of the pores may be preferably set at 2 µm or less, the porosity of the pores may be preferably set in a range of 20% to 90%, and preferably 20% to 50%, and the thickness of the membrane 150 may be preferably set in a range of 4 µm to 12 µm.

The membrane 150 may have a plurality of pores, or may be in the form of a non-porous film. In other words, the membrane 150 may be one of a pore structure, a semi-pore structure, and a non-porous structure.

The polymer material usable in the present invention is not particularly limited as long as it is a resin that can be dissolved in a solvent for electrospinning and is capable of forming fibers by electrospinning. For example, the polymer material may include: polyvinylidene fluoride (PVdF), poly (vinylidene fluoride-co-hexafluoropropylene), perfluoropolymers, polyvinyl chloride or polyvinylidene chloride, and co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene, polystyrene acrylonitrile co-polymers, polyacrylonitrile (PAN), and polyacrylonitrile methyl methacrylate co-polymers; and polymethyl methacrylate and polymethyl methacrylate co-polymers, and a mixture thereof.

The solvent may employ at least one selected from the group consisting of DMAc (N, N-dimethyl acetoamide), DMF (N, N-dimethylformamide), NMP (N-methyl-2-pyrrolidinone), DMSO (dimethyl sulfoxide), THF (tetra-hydrofuran), EC (ethylene carbonate), DEC (diethyl carbonate), DMC (dimethyl carbonate), EMC (ethyl methyl carbonate), PC (propylene carbonate), water, acetic acid, formic acid, chloroform, dichloromethane, acetone, and isopropylalchol.

Referring to FIG. 2, a method of assembling a sound device according to an embodiment of the present invention includes interposing a first adhesive foaming tape 132 between a membrane 150 and a case 110, interposing a second adhesive foam tape 131 between an electro-acoustic transducer 120 and the membrane 150, is applying pressure in the direction of the case 110 from the electro-acoustic transducer 120, and fixedly bonding the membrane 150 and the electro-acoustic transducer 120 to the case 110 by using an adhesive material filled in a plurality of pores formed in the first and second adhesive foam tapes 132 and 131.

As described above, in some embodiments of the present invention, the membrane 150 and the electro-acoustic transducer 120 are adhered to and assembled with the case 110 with the adhesive material filled in the plurality of pores formed in the first and second adhesive foam tapes 132 and 131, and therefore, the adhesive material is restrained by the adhesive surfaces of the first and second adhesive foam tapes 132 and 131 and does not leak to the outside.

When the sound device according to some embodiments of the present invention is not attached and fixed to the electro-acoustic transducer 120, a first adhesive foam tape 132 is interposed between the membrane 150 and the case 110, pressure is applied in the direction of the case 110 from the membrane 150. Accordingly, the membrane 150 is adhered and fixed to the case 110 with an adhesive material filled in the plurality of pores of the first adhesive foam tape 132. A cushioning member is attached to the whole surface of the electro-acoustic transducer 120.

Figure 3:
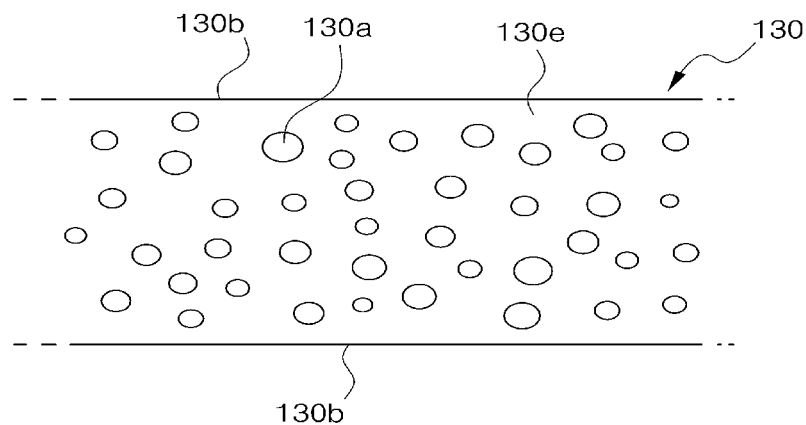
FIG. 3 is a plan view schematically showing an adhesive surface of an adhesive foam tape applied to a sound device according to an embodiment of the present invention.
Figure 4:
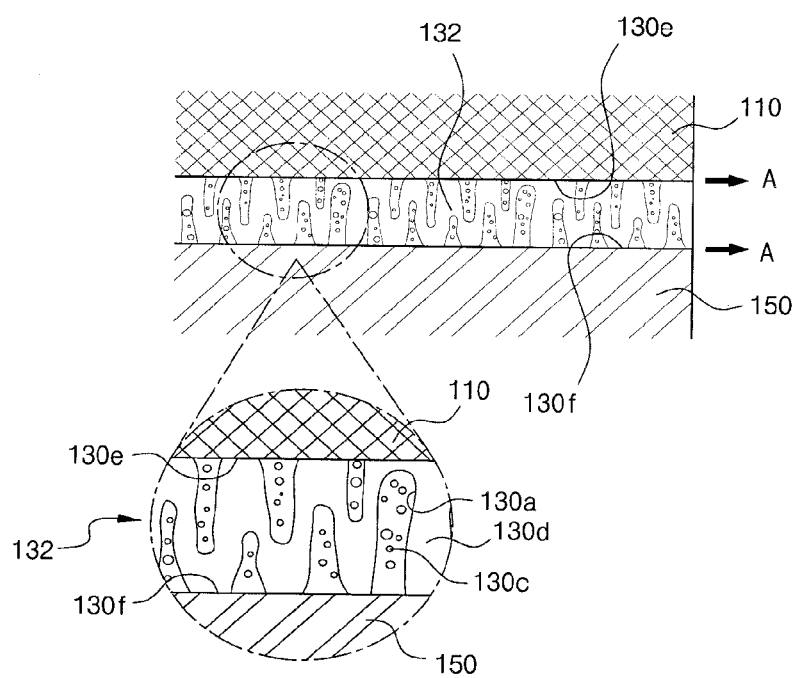
FIG. 4 is a schematic partial cross-sectional view for explaining the state of an adhesive surface of an adhesive foam tape applied to a sound device according to an embodiment of the present invention.

In other words, as shown in FIGS. 3 and 4, a plurality of pores 130a are formed on an adhesive surface 130e on either side of an adhesive foam tape 130, and an adhesive material 130c is filled in the plurality of pores 130a. Here, the distance between the respective pores 130a may be several micrometers, and the sizes of the respective pores 130a may be different from each other.

The body 130d of each of the first and second adhesive foamed tapes 132 and 131 has a plurality of pores 130a and is a foam tape having a porous elastic structure capable of being compressed and restored when pressure is externally applied thereto, and serves to receive the adhesive material 130c filled in the pores 130a while partially deforming the shape of the pores 130a according to the external pressure.

Here, the adhesive material 130c is diffused toward the adhesive surface 130e during a pressure bonding process of the first and second adhesive foam tapes 130 in the state of being filled in the plurality of pores 130a, to thereby form a bonding force, and the remaining adhesive material 130c which has not formed the bonding force on the adhesive surface moves back into the pores 130a. That is, since the pores 130a of the first and second adhesive foamed tapes 132 and 131 are not connected to each other by a network, the adhesive material 130c does not escape from the adhesive surface 130e of each of the first and second foam tapes 132 and 131 and does not leak to the outside of the edge 130b according to deformation of the body 130d having a porous elastic structure.

As shown in FIG. 4, when the first adhesive foam tape 132 is used to press the membrane 150 against the case 110 o bond the membrane 150 to the case 110, in the sound device according to some embodiments of the present invention, the adhesive material 130c hardly leaks outwardly from the adhesive surface 130f between the first adhesive foam tape 132 and the membrane 150 and the adhesive surface 130e between the first adhesive foam tape 132 and the case 110 in the outer direction A.

Figure 5:
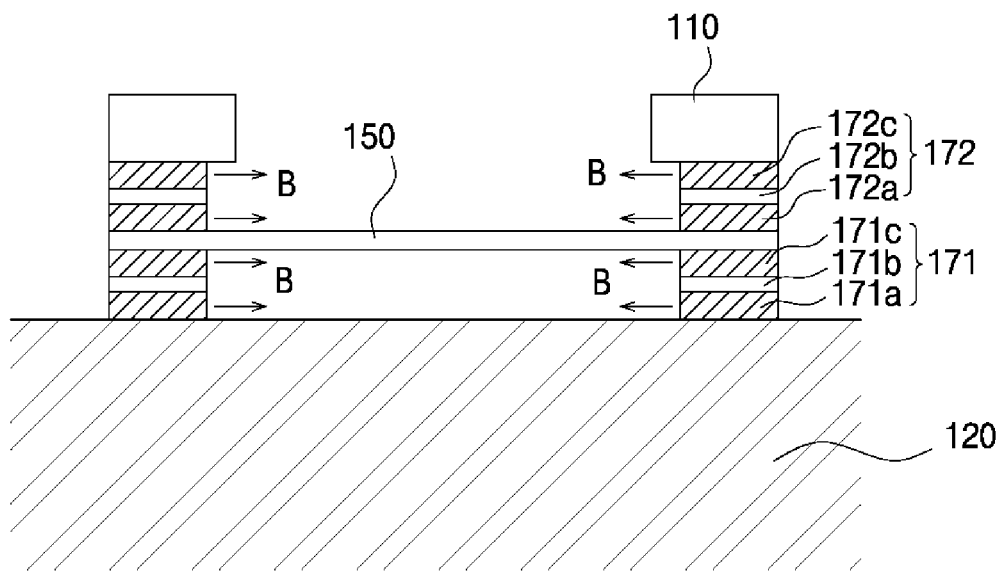
FIG. 5 is a conceptual cross-sectional view of a sound device according to a comparative embodiment of the present invention.

Referring to FIG. 5, the sound device according to a comparative example is realized by press-bonding the membrane 150 to the case 110 and the electro-acoustic transducer 120 by using double-sided tapes 171 and 172. In this case, the adhesive material of the first and second double-sided tapes 171 and 172 leaks outwardly in the outer directions B.

That is, since the double-sided tapes 171 and 172 each have the structure in which the adhesive layers 171a, 171c, 172a, and 172c are formed on both surfaces of the base layers 171b and 172b, the adhesive layers 171a, 171c, 172a and 172c cannot be absorbed by the base layers 171b and 172b but are released and leaking outwardly in the outer directions B.

When a part of the adhesive layers 171a, 171c, 172a and 172c leaks to the membrane 150, the vibration of the membrane 150 is attenuated and the deformed vibration is generated. Therefore, there is a problem that the distorted sound is transmitted to the electro-acoustic transducer together with a decrease in the sound pressure level (SPL) or the sound generated in the electro-acoustic transducer is distorted and transmitted to the user.

Figure 6:
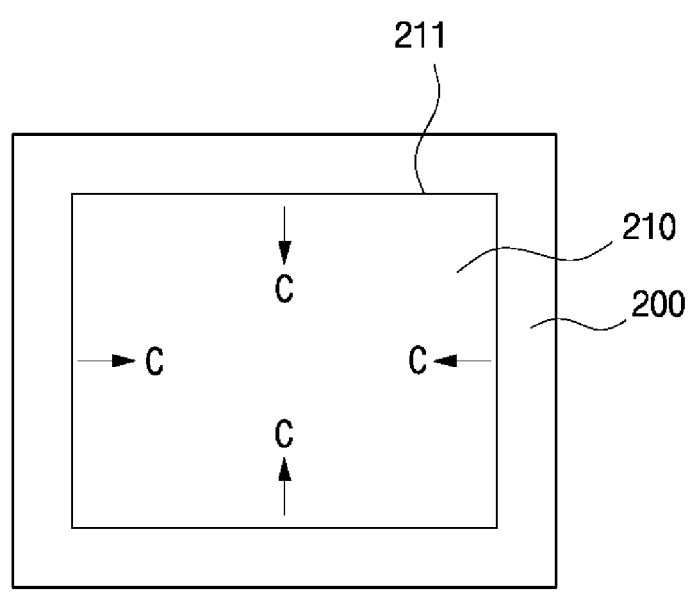
FIG. 6 is a plan view of an adhesive unit applied to the embodiment of the present invention and the comparative example thereof.
Figure 7:
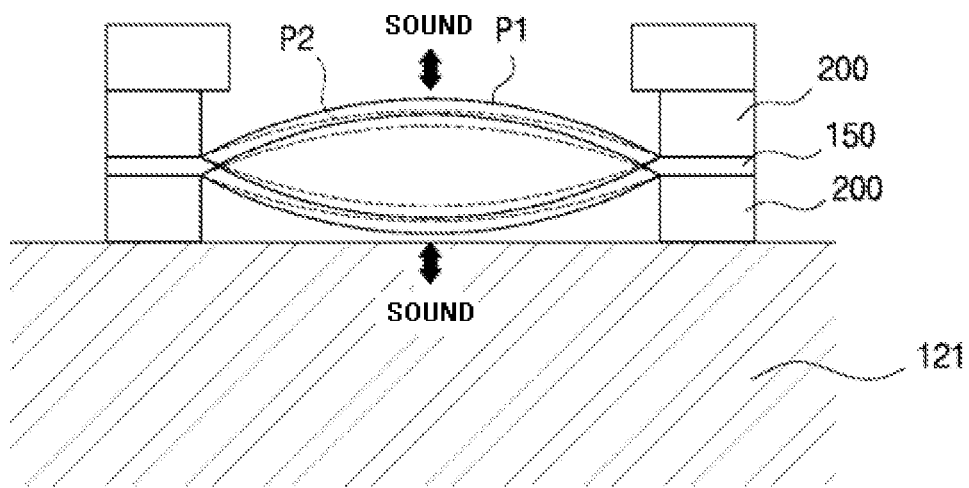
FIG. 7 is a schematic cross-sectional view for explaining the vibration of the membrane in a state where the sound devices of the embodiment of the present invention and the comparative example thereof are applied to waterproof and seal the sound-transmitting hole of the case.

FIG. 6 is a plan view of an adhesive unit applied to the embodiment of the present invention and the comparative example thereof, and FIG. 7 is a schematic cross-sectional view for explaining the vibration of the membrane in a state where the sound devices of the embodiment of the present invention and the comparative example thereof are applied to waterproof and seal the sound-transmitting hole of the case.

As described above, an adhesive foam tape is used as a bonding unit in the present invention, and a double-faced tape is used as a bonding unit in a comparative example. The bonding unit 200 applied to the present invention and the comparative example is provided with an air permeable passage 211 formed by blanking and removing a central region 210 as shown in FIG. 6.

In this case, even if the pressing force for blanking is applied, the adhesive foam tape of the present invention does not leak the adhesive material in the direction C of the central region 210 since the adhesive material is constrained to the adhesive surface, but the adhesive material is released from the base layer in the double-sided tape of the comparative example and leaks in the direction C of the central region 210.

Therefore, since the bonding unit 200 of the adhesive foam tape applied to the sound device according to some embodiments of the present invention is configured so that the adhesive material is contained in the plurality of pores 130a, the adhesive material 200 does not leak to the outside during the blanking process of the adhesive foam tape or the process of bonding the membrane 150 to the case 110 and the electro-acoustic transducer 120, but the bonding unit 200 of the adhesive foam tape applied to the sound device according to the comparative example may cause the adhesive material 200 to leak to the outside during the blanking process or the bonding process.

In the case where a microphone is used as the electro-acoustic transducer, the case where no membrane is attached to the sound-transmitting hole (when the membrane is not applied), the case of the embodiment using the bonding unit of the adhesive foam tape, and the case of the comparative example using the double-sided tape as the bonding unit, the sound pressure level (SPL) was measured at a frequency of 1 kHz, and the results are shown in Table 1 below.

TABLE 1

| When the membrane is not applied | The embodiment of the present invention | Comparative Example |
|---|---|---|
| −41.1 dB | −42.8 dB | −52.8 dB |

As shown in Table 1, in the case of the sound device according to the embodiment of the present invention using the bonding unit such as the adhesive foam tape, the difference in the sound pressure level (SPL) hardly occurs as compared with the case where the membrane is not applied. However, in the comparative example using a double-sided tape as a bonding unit, it appeared that the sound pressure level (SPL) decreased by −11.7 dB when compared with the case where the membrane was not applied. In other words, in the embodiment of the present invention, effective sound transmission is performed with almost no attenuation while passing through the membrane, but in the case of the comparative example, it can be seen that effective sound transmission cannot be achieved due to a large attenuation while passing through the membrane.

In addition, when a large amount of attenuation occurs while passing through the membrane as in the comparative example, distortion of the transmitted sound occurs by accompanying distortion of the characteristic of the membrane 150.

Meanwhile, when the sound device is bonded to the electro-acoustic transducer 121 such as a speaker or a microphone, the membrane 150 transmits gas such as air, and vibrates while being deformed as shown in FIG. 7. The sound emitted from the electro-acoustic transducer 121 can be transmitted to the outside or the sound inputted from the outside can be transmitted to the electro-acoustic transducer 121.

That is, as shown in FIG. 7, since the adhesive material of the adhesive foam tape does not leak to the outside, in the sound device according to some embodiments of the present invention, the vibration P1 of the membrane 150 does not cause the lowering of the characteristics depending on the intrinsic characteristics of the membrane 150, to thereby prevent the distortion of the transmitted sound.

Meanwhile, in the sound device according to the comparative example, the adhesive material of the double-sided tape leaks to the outside and permeates the membrane 150, thereby changing the weight of the membrane 150 or deforming the shape of the membrane 150. Moreover, the adhesive material leaked from the double-sided tape excessively bonds the membrane 150.

Therefore, the sound device according to the comparative example causes a disadvantage that the leaked adhesive material interferes with the movement of the membrane 150, to thus attenuate the vibration P2 of the membrane 150 or perform the deformed vibration to thereby transmit distorted sound.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is applied to a sound device that prevents external leakage of an adhesive material by attaching a membrane to a case by using an adhesive foam tape having a plurality of pores filled with an adhesive material on an adhesive surface, and enables the prevention of a deterioration of vibration amplitude-related properties of the membrane, and the prevention of a distortion of sound that is being delivered.

What is claimed is:

1. A sound device having a sound-transmitting hole, the sound device comprising:
   a case having a sound-transmitting hole formed therein, an electro-acoustic transducer being disposed inside the case;
   a waterproof air-permeable membrane bonded inside the case to cover the sound-transmitting hole, wherein the waterproof air-permeable membrane allows gas to pass the sound-transmitting hole, but blocks inflow of water; and a first adhesive foam tape bonding the waterproof air-permeable membrane to the inside of the case, wherein the first adhesive foam tape includes: a body; a first adhesive surface formed in one side of the body and bonded to the inside of the case; a second adhesive surface formed in the other side thereof and bonded to the waterproof air-permeable membrane; pores formed in the body; and an adhesive material filled inside the pores, wherein the pores are open in the first adhesive surface and the second adhesive surface, but not interconnected with each other.

2. The sound device of claim 1, further comprising: a second adhesive foam tape bonding the waterproof air-permeable membrane to the electro-acoustic transducer.

3. The sound device of claim 1, wherein the pores comprises: first pores open to the first adhesive surface and second pores open to the second adhesive surface, and the first pores and the second pores are not interconnected with each other.

4. The sound device of claim 1, wherein the first adhesive foam tape is formed of an elastic material and has a compressibility in a range of 20% to 70%.

5. The sound device of claim 4, wherein the compressibility is in a range of 20% to 40%.

6. The sound device of claim 1, wherein the waterproof air-permeable membrane is formed of elecrospun and accumulated polymer fibers.

7. The sound device of claim 6, wherein the waterproof air-permeable membrane has a plurality of pores.

8. The sound device of claim 7, wherein the waterproof air-permeable membrane has a porosity in a range of 20% to 90%.

9. The sound device of claim 8, wherein the porosity is in a range of 20% to 50%.

10. The sound device of claim 6, wherein the waterproof air-permeable membrane is a non-porous film.

11. The sound device of claim 6, wherein the elecrospun and accumulated polymer fibers have a diameter in a range of 0.1 μm to 2 μm and the waterproof air-permeable membrane has a thickness in a range of 4 μm to 12 μm.

12. The sound device of claim 1, wherein the first adhesive foam tape has a thickness in a range of 50 μm to 250 μm.

13. The sound device of claim 1, wherein the first adhesive foam tape is formed of any one of an acrylic foam, a urethane foam, and a polyethylene (PE) foam.

14. The sound device of claim 1, further comprising: a cushion member disposed between the waterproof air-permeable membrane and the electro-acoustic transducer.

* * * * *